United States Patent Office 3,494,939
Patented Feb. 10, 1970

3,494,939
GLYCIDOXY - BISNUCLEAR - PHENOLIC ETHERS OF OXA-SUBSTITUTED ALIPHATIC DIOLS AND TRIOLS
Carl M. Smith, White Bear Lake, Minn., assignor to Minnesota Mining and Manufacturing Company, St. Paul, Minn., a corporation of Delaware
No Drawing. Original application Mar. 9, 1964, Ser. No. 350,524, now Patent No. 3,393,229. Divided and this application Sept. 25, 1967, Ser. No. 679,278
Int. Cl. C07d *1/00;* C08g *33/10*
U.S. Cl. 260—348                1 Claim

ABSTRACT OF THE DISCLOSURE

Polymerizable di or trifunctional monomers having terminal phenolic hydroxyl, glycidyl, or acrylate or methacrylate groups are provided. The bridging group is basically a polyoxyalkylene glycol chain with aromatic groups at each end. Each aromatic group may include two or one benzene ring. Single benzene rings at each end may also be substituted by carboxyl groups and derivatives thereof. Acrylate or methacrylate groups are joined to aromatic groups through glyceryl groups.

---

This application is a division of application Ser. No. 350,524, filed Mar. 9, 1964, now U.S. Patent 3,393,229.

This invention relates to a new class of compounds and particularly to polyethers of polyalkylene oxide polyols with functionally substituted phenols and to the process for production thereof.

The compounds of the invention are a class of new compounds having a molecular weights from about 540 to about 2000. They are very useful as prepolymers and are capable of reaction in diverse ways, as more fully hereinafter described, to produce useful cross-linked resins having value for applications where the outstanding properties of the cross-linked resins can be exploited as will be evident to those skilled in the art. Inasmuch as great variation of structure and properties is possible within the scope of the invention it will be understood that many fields of applicability are fully possible of which not all will necessarily be hereinafter exemplified.

Broadly the compounds of the invention are polyethers of at least five-fold and not more than fifty-fold oxa-substituted aliphatic polyols etherified at 2 to 3 hydroxyl positions with functionally substituted phenolic aromatic compounds. As will become evident from the following disclosure the polyols have the oxa-substituents separated by at least two and up to six carbon atoms.

The phenolic aromatic compounds have a nucleus comprising from 1 to 2 benzene rings and not more than one catenary carbon atom. The term catenary carbon atom refers to a carbon atom which does not form a part of a benzene ring and is included in the catenary sequence of carbon atoms starting from the oxygen atom of the functional substituent nearest a benzene ring and proceeding through the aromatic compound to the phenolic oxygen which participates in ether formation. Practically, catenary carbon atoms, as here defined, are either the carbon atoms of carboxyl groups (and derivatives of such groups) and carbon atoms connecting two benzene rings. The latter may be substituted by one or two alkyl or phenyl groups of up to 6 carbon atoms and it will be seen that these substituents do not form a part of the catenary sequence aforesaid.

One benzene ring is substituted by a reactive functional group of the class of hydroxyl or derivatives thereof, viz glycidoxy

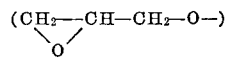

acrylyl glyceroxy (CH₂=CH—CO—O—CH₂—CHOH—CH₂—O—)

methacrylyl glyceroxy (CH₂=C(CH₃)—CO—O—CH₂—CHOH—CH₂—O—)

or carboxyl (—COOH) or derivatives thereof, viz. carboxyalkyl (—COO alkyl), carbamide (—CONH₂) or carbhydrazide (—CONHNH₂). The alkyl groups of the carboxyalkyl group are lower alkyl, that is, up to about six carbon atoms. Other than the reactive functional groups recited above and the phenolic groups the only substituents on benzene rings of the nucleus are nonfunctional of the class of hydrogen, chlorine, bromine and hydrocarbon groups of up to 4 carbon atoms e.g. methyl, ethyl, allyl, butyl and the like. When there are two benzene rings, the functional group and phenolic group are on different rings. Halogens and alkyl groups may be up to two in number on each benzene ring of the nucleus.

When there are two benzene rings they may be connected directly or they may be spaced apart and connected by oxygen, sulfur, sulfone or by one carbon of a hydrocarbon group of 1 to 13 carbon atoms, e.g. methylene, isopropylidene, diphenylmethylene and the like.

Because of the complexity of the structure of the compounds of the invention is is more convenient to employ a notation system for the representation of structures in which symbols are used to represent groups of atoms than to attempt to show entire structural formulae in the usual notation. These symbols are now defined so that the meaning of expressions used hereinafter will be clear.

Q is employed to represent the unsubstituted alkylene residue having 2 to 6 carbon atoms of a polyol having from 2 to 3 reactive hydroxyl groups. It is thus an *m*-valent hydrocarbon radical. It will be evident that there is no more than one valence on any one carbon atom and that *m* is a number from 2 to 3 so that only hydrocarbon radicals having 3–6 carbon atoms can have 3 valences. Without attempting to name every possible radical, which would not be any more clear to those skilled in the art, the following radicals are exemplary:

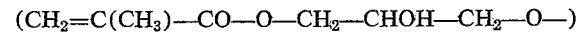

and the like.

The symbol alk is employed to represent a divalent alkylene residue of 2 to 4 carbon atoms formed from an alkylene oxide. In particular it represents the group —CH₂—CH₂— but it also represent the asymmetrical groups

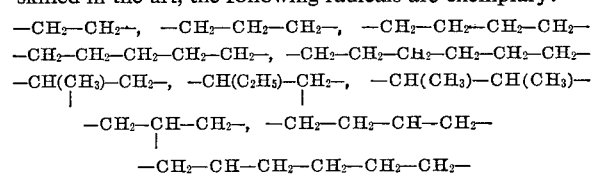

and the asymmetrical groups —CH(CH₃)—CH(CH₃)— and —CH₂CH₂CH₂CH₂—.

Each of the *m* valences of the Q group in the compounds of the invention is satisfied by one valence of an alk group attached through an oxygen atom. When the alk and Q groups are the same and all are asymmetrical, the asymmetry, that is, the branched carbon, is always to the same side. When the groups are different, the asymmetry of the alk groups, if any, is usually distal of the Q groups.

The above described combination of $m$-alk-groups attached through oxygen to the $m$ valences of a Q group is further complicated because $n$ of the alk groups may also be linked together through oxygen atoms to satisfy the valence of the Q group in the form shown as $$-(alk-O)_n-$$

asymmetry being arranged as above described, and where $n$ is a number from about 3 to about 20, which may not on the average be integral, and where the arithmetic product of $n$ and $m$ is not greater than about 50.

Distal to the Q groups and attached to the alk groups through oxygen atoms are functionally substituted aryl groups Y-Ar— where Ar is a member of the group of divalent radicals consisting of phenylene, alkyl phenylene, alkenyl phenylene and dihalo phenylene and Y is a functional group, which may include an aromatic ring. In particular, Y is a member of the group of monovalent radicals consisting of —OH, —C$_6$H$_4$—OH, —O—C$_6$H$_4$—OH, —SO$_2$—C$_6$H$_4$—OH, —C(R$^2$)$_2$—C$_6$H$_4$—OH, $$-C(R^2)_2-C_6H_3R-OH$$

$$-C(R^2)_2-C_6H_2R_2-OH \quad -C(R_2)_2-C_6H_3R'-OH,$$

$$-C(R^2)_2-C_6H_2R_2'-OH$$

$$-C(R^2)_2-C_6H_2X_2OH, \quad -COOH, \quad -CONH_2$$

$$-CONHNH_2$$

and —COOR where R is lower alkyl of 1 to 4 carbon atoms, R' is lower alkenyl of 3 to 4 carbon atoms, R$^2$ is hydrogen, alkyl of 1 to 6 carbon atoms and phenyl and X is halogen of atomic number 17 to 35. These compounds in which Y is —COOH, —CONH$_2$ and —CONHNH$_2$ are most conveniently prepared from the corresponding esters in which Y is —COOR.

Ethers in which Y includes a phenolic hydroxyl are included within the invention, for example glycidyl ethers and acrylyl- and methacrylyl-glyceryl ethers. The latter two are formed either by reaction of the glycidyl ethers with acrylic or methacrylic acid, respectively, or preferably by reaction of the phenol with glycidyl acrylate or methacrylate. These ethers are respectively oxirane resin prepolymers and acrylate-type monomers.

It will be seen that the compounds of the invention are thus of the formula $$[Y-Ar-O-(alk-O)_n]_mQ$$

and any of the above recited groups or their equivalents within the scope of the terms as defined are combined in accordance with this formula and represent compounds of the invention. Inasmuch as combination of groups in this manner is within the skill of the art no attempt is made to recite individual compounds by name, each of which would be long and cumbersome, but all such compounds are contemplated by the above formula. Where alkyl or lower alkyl groups are indicated unsubstituted hydrocarbon radicals of the aliphatic series from methyl through hexyl are intended and where alkenyl is indicated reference is particularly to allyl groups.

A further reason for not attempting to name individual compounds is that, as prepared and commercially available, many of the intermediate polyglycols of the formula [HO(alk-O)$_n$]$_m$Q are obtained in admixture so that the value of $n$ is given in the formula may be fractional. These polyols generically are at least five-fold and not more than fifty-fold oxa-substituted aliphatic polyols.

A further method of notation is useful as a simplification of the term —O-(alk-O)$_n$— when alk and Q are the same. For this the nature of the alk group as an ethylene, propylene, or butylene, radical is indicated by the initial letter, E, P, or B, respectively, and the degree of complexity is designated by use of the average molecular weight of the corresponding glycol as a subscript, thus, $$E_{300}, P_{425}, \text{ and } B_{500}$$

represent respectively the residues in which ethylene, propylene and butylene residues are present in polyalkylene glycols having respective molecular weight of 300, 425 and 500.

In spite of the complexity of the compounds of the invention, it has been found that they are surprisingly easy to prepare using polyoxa-substituted alkylene polyols many of which are available in commerce and others of which are readily formed, as will be recognized by those skilled in the art, by reaction of the selected alkylene oxide with the selected polyol or with itself. Since the formation of the polyalkylene glycol polyols does not form a part of the present invention and since the reactions are well known in any event, they are not further described. Polyols ranging from ethylene glycol to hexitols can be employed as suitable starting structures together with ethylene, propylene or the butylene oxides or, as stated hereinabove, many suitable polyalkylene glycol polyols are available in commerce.

The compositions of the invention are prepared in two stages. The first stage is the formation of the polyarenesulfonates of the polyalkylene glycol polyol:

$$[HO(alk-O)_n]_mQ + mZSO_2Cl + mNR_3 \rightarrow$$
$$[ZSO_2O(alk-O)_n]_mQ + mNR_3 \cdot HCl$$

where R$_3$ represents three lower alkyl groups such as methyl, ethyl, butyl or the like and Z represents a simple arene group such as phenyl, p-tolyl, p-chlorophenyl, p-bromophenyl, p-anisyl or metanitrophenyl or the like. The term arene is the noun corresponding to the adjective aryl. It is preferred that NR$_3$ be triethylamine. Because of their availability, the preferred arene sulfonyl chlorides are benzene- and p-toluene-sulfonyl chloride. The polyol arene sulfonates formed in this stage of the process are useful and important intermediates when produced as described herein because of good purity and substantial freedom from quaternized compounds. Quaternization is undesirable and is particularly the result when other amines such as pyridine are employed. Polyol arene sulfonates contaminated with e.g. pyridinium quaternary compounds may be used but give more side reactions and are somewhat less desirable.

The second stage of the process is to react the intermediate arene sulfonate with a suitable functionally substituted phenolic compound in the presence of a slight excess (based on the sulfonate ester) of a strong base. For the sake of economy of operation it is preferred to use sodium hydroxide, but other soluble metal hydroxides can be used such as potassium hydroxide, etc. The quaternary ammonium hydroxides can also be used, but offer no known advantage other than possibly the introduction of less ash. In general, it may be stated that a soluble strong base herein represented as MOH is employed. Ammonium hydroxide is not sufficiently strong and leads to side reactions. The general reaction is given by the equation:

$$[ZSO_2-O-(alk-O)_n]_m-Q + MZSO_3M \rightarrow$$
$$[YAr-O-(alk-O)_n]_mQ + mArSO_3M + mH_2O$$

wherein Y, Q, Z, Ar, $n$ and $m$ have the above significance and M is the cation of a strong base, particularly alkali metal cation.

In the above process the functionality of the compound will depend upon the completeness of the reaction as well as the value of $m$. In particular for those compositions in which $m$ is 2 it is desirable for many purposes that the functionality of the composition be very close to 2 or, stated differently, that the above reaction should proceed to substantially completion, i.e. above 95% and preferably above 98%. Although this may appear to be a very simple objective, in practive it is very difficult to achieve because no reaction can take place on free unesterified hydroxyl groups remaining from the polyol or on quaternized sulfonate ester groups, and hydroxyls of the Y groups may serve to interconnect molecules to give higher molecular weight subpolymeric molecules.

The first of these adverse conditions is very largely overcome by the use of the above procedure for the synthesis of the arene sulfonates. Although some polyol sulfonate esters are known in the art, it has been conventional to use pyridine as the base in their synthesis. Pyridine quaternizes with the sulfonate esters very many times more readily than triethylamine and the resultant compounds are therefore often too impure to be useful in the second step of the above process. Furthermore, the reactivities of primary and secondary carbinol groups are sufficiently different that somewhat forcing conditions are necessary which serve also to force quaternization. This latter is not a serious problem when all the alk groups are ethylene, but is a problem when propylene or higher groups are present. The process described herein in which triethylamine is employed in the formation of polyol arene sulfonates is therefore the preferred process in making these intermediates.

The second of the above adverse conditions is controlled so that substantially all of the YAr groups are terminal by using slightly over 2 moles of the phenol YArOH per mole of the bissulfonate and by employing slightly less per mole of the phenol than the amount of sodium hydroxide (i.e. MOH) which is chemically equivalent to the phenol. By observation of these conditions compositions of the invention are obtained which have substantially an equivalence of 2.

In the first step of the process, reaction is conveniently carried out in the presence of a non-aqueous, unreactive solvent so that the tertiary amine hydrochloride separates from the reaction mixture. Suitable solvents for this purpose include aromatic hydrocarbons such as benzene, toluene, xylene, and the like and ethers such as diethyl ether. The reaction occurs readily at ambient temperatures and cooling the reaction mixture during addition of the sulfonyl halide is usually necessary so that the temperature is maintained from about 20° to 30° C. and preferably from about 23° to 28° C. Since the polyalkylene glycol polyols may contain small amounts of oxidation products, e.g. carbonyl compounds, some preliminary purification may be necessary such as a reduction step suitably with sodium borohydride. This is not to be considered as a step in the process but as a purification step which is desirable if best results are to be obtained. The sulfonate esters are isolated by separation of the tertiary amine hydrochloride and evaporation of the solvent. The intermediate sulfonate esters thus obtained are oily or solid materials which can be stored under anhydrous conditions in a cool place for months, if desired.

The second step of the reaction is carried out under substantially anhydrous conditions preferably in a polar solvent such as lower aliphatic alcohol, e.g. alkanolic medium, with the exclusion of oxygen which might cause oxidation of the phenolic materials under the strongly basic conditions employed. It is not necessary that only one alcohol be employed and mixtures are contemplated. Temperatures are generally from about 30° C. to the boiling point of the highest boiling of the alcohols used, e.g. 138–9° C. for pentanol-1. The salt of the arene sulfonic acid, e.g. sodium benzene sulfonate, separates out during the reaction and is collected by filtration and washed. The filtrate and washes are combined, neutralized, washed and concentrated to give the products of the invention.

It will be seen that depending on the functional group of the Y group employed, the molecules of the products of the invention may be terminated by different groups, that is, in one batch all of the groups will terminate the same way, but by variations as herein disclosed molecules otherwise comparable may have different terminal groups. Terminal groups may be changed by reactions with asymmetrically difunctional reactants as set forth below. It will also be seen that molecules may have two to three terminal groups. Because of the relative unreactivity of the ether linkages in the back bones of these compounds, reactants which might attack the chain of many types of polymers can be employed with these compounds to effect desired reactions without effect on the chain linking the spatially relatively remote reactive functional groups of these compounds which are effectively terminal. The two most important functional groups to be considered in this respect are —OH and —COOH and the derivatives thereof.

The various carboxyl group containing compounds can be interconverted, if desired, by usual types of procedures and may be converted, particularly by aminolysis of esters to amides, hydrazides etc., which are useful curing agents for epoxy resins. The hydrazides moreover are convertible by heating in vacuo to polyamino triazoles.

The hydroxyl substituted compounds of the invention will be seen to be bisphenols, or tris-phenols when $m$ is 3. These are useful as intermediates for the formation of valuable prepolymers. It will be recognized that reactions with those compounds in which $m$ is 2 will tend to be different from those in which $m$ is 3, in that cross-linking will only be effected if an at least trifunctional reactant is employed in the former case, whereas even a difunctional reactant will lead to cross linking in the latter case.

The monofunctional reactants which are most usefully reacted with the bisphenols (as well as the higher polypolyphenols) of the invention are ether forming compounds, particularly those which contain some group capable of further reaction in a further polymerization reaction. Of particular importance are compounds such as allyl chloride or bromide which lead to unsaturated ethers and epichlorhydrin which leads to the formation of glycidyl ethers of the compounds of the invention which are then valuable prepolymers of the type of epoxy resins but having unusual properties as a result of the ether containing linking groups.

These compositions of the invention are different from the heretofore known glycidyl polyethers described in German Patent 1,104,696 prepared from the polyphenols described in U.S. Patent 2,060,715 in that the terminal aromatic groups are separated by alkylene ether chains containing at least 4 ether oxygen atoms and preferably 5 or more.

Symmetrically difunctional reactants which may be usefully employed with the novel bisphenols of the invention include for example, phosgene which produces polycarbonates and formaldehyde which is effectively a 1,1-diol. Depending on the conditions employed, the latter leads to phenolformaldehyde resins of all degrees of cure from rubbery to completely thermoset materials having good flexibility and toughness.

Asymmetrically difunctional reactants, i.e. having two different functional groups may be reacted at one end with the novel bisphenols of the invention and provide groups having other reactivity at the unreacted end. Such reactants serve to cap the bisphenols of the invention, for example, reaction with glycidyl acrylate or methacrylate provides bisacrylates or bismethacrylates caps respectively to the bisphenols. These compounds are then valuable vinyl-type monomers possessing unusual combinations of flexibility and toughness.

The invention having been described in general terms as to scope, it is now more particularly illustrated by particular examples not intended to limit the invention but intended to show those skilled in the art how to practice the invention in the best mode presently contemplated. It will be understood that in these examples parts are by weight where not otherwise specified and temperatures are in degrees centigrade. Moles are in gram molecular weights and equivalents in stoichiometric proportions. For convenience in reference the examples are divided into sec-

(I) PREPARATION OF POLYALKYLENE GLYCOL POLYOL SULFONATES

Example 1

The polyalkylene glycol polyol employed for this example is a polyethylene glycol of molecular weight about 300 (denoted $E_{300}$) corresponding approximately to $HO(C_2H_4O)_{6.4}H$. A suitable vessel fitted with mechanical stirrer, thermometer, dropping funnel and reflux condenser is charged with 1200 parts (4 moles) of the glycol $E_{300}$ and to it are added 3.6 parts of sodium borohydride and the mixture is stirred at room temperature (about 20° C.) until solution is effected and the mixture is then allowed to stand for about 24 hours. This effects chemical reduction of contaminants such as carbonyl compounds present in the commercial glycol which might otherwise act as chromogens and result in excessive discoloration during subsequent reactions.

At the end of the above period, stirring is commenced and 600 parts of toluene are added as a diluent together with 820 parts of triethyl amine (commercial grade, anhydrous boiling 88–90° C.). External cooling of the vessel is started and 1433 parts (8.1 moles) of benzene sulfonyl chloride (distilled under vacuum before use) are added gradually over about 3 hours maintaining the temperature of the reaction mixture at 25±2° C. Stirring is then continued without external cooling for 24 hours at about 25° to 28° C. At this point an aliquot of the liquid phase is found by titration to be substantially free from triethylamine and the reaction mixture is filtered to remove the precipitated crystalline triethylamine hydro chloride which is washed with toluene. The combined filtrate and washes are then stirred for 3 hours with solid sodium bicarbonate, separated and the cake of solid washed with more toluene and the pooled liquids evaporated under a pressure of 20–200 mm. Hg to remove toluene at temperatures below 45° to 55° C. until constant weight is obtained. The polyethylene glycol bisbenzene sulfonate is obtained in almost quantitative yield as a light amber-colored oil.

Example 2

The procedure described in Example 1 is repeated employing a mixture of 637.5 parts of polypropylene glycol ($P_{425}$), 200 parts of toluene and 318 parts of triethylamine to which 536 parts of benzene sulfonyl chloride are added during 2 hours at 25° C. The initial reduction with sodium borohydride is not employed as there is relatively little contamination of this glycol. After the addition, stirring is continued at about 25° C. for 72 hours and the reaction mixture is worked up as in Example 1. The polypropylene glycol 425 bis benzene sulfonate is obtained as a brownish colored oil in almost quantitative yield.

By the same procedure bis benzene sulfonates of polypropylene glycol 1025 and polybutylene glycol 1000 prepared using the corresponding stoichiometric proportions and are obtained as brownish colored oily materials.

Example 3

The bis-sulfonate ester of polyethylene glycol ($E_{414}$) is prepared as described in Example 1 from 648 parts (4.00 moles) of the commercially available glycol, 500 parts of toluene, 820 parts of triethylamine and 1423 parts of benzene sulfonyl chloride. The bis-sulfonate ester is recovered as a viscous pale tan colored oil.

The same procedure is applicable to mixed polyalkylene glycols. Thus, 525 parts of the mixed glycol believed to have the formula:

$$HO-C_2H_4O-(C_3H_6O)_{16.3}-C_2H_4OH$$

having an average molecular weight of about 1050 (available under the designation Pluronic L-31 from Wyandotte Chemical Co.) is reacted in 250 parts of toluene containing 105 parts of triethylamine with 177 parts of benzene sulfonyl chloride. The reaction mixture is worked up as in earlier examples to give the bis-sulfonate of the mixed glycol as a viscous yellowish oil.

Example 4

The bis-sulfonate ester of polyethylene glycol ($E_{600}$) is prepared as above from 300 parts (0.5 mole) of the glycol, 105 parts of triethylamine and 177 parts (1.00 mole) of benzene sulfonyl chloride. It is isolated by the procedures described above employing toluene as a diluent and is a light tan colored semi-solid.

Example 5

The procedure described in Examples 1 and 2 above is repeated employing 698 parts (1.0 mole) of a commercial triol believed to be 1,2,6-tris(omega hydroxy polypoxy)hexane of the formula:

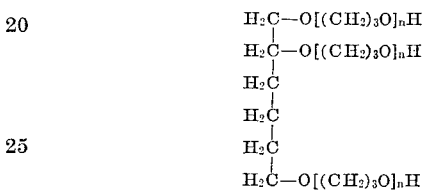

where $n$ is about 3.3, available under the designation Niax-triol LHT–240 from Union Carbide Chemicals Co., 300 parts of toluene and 318 parts (3.15 moles) of triethylamine and adding 536 parts (3.02 moles) of benzenesulfonyl chloride during 1 hour while maintaining the temperature at 25° C. Stirring is continued at ambient temperature (about 25° C.) for 72 hours and the reaction mixture is then worked up as described in Example 1 above. The tris benzene sulfonate is obtained as a brownish colored oil in almost quantitative yield. Saponification equivalent: Calculated: 373. Found: 365.

PREPARATION OF ARYL ETHERS

Example 6

This example further illustrates the preparation of functionally substituted phenyl bis ethers of polyalkylene oxide diols.

(A) A vessel fitted with stirrer, thermometer, reflux condenser (with soda lime tube) and nitrogen inlet is charged with 151.8 parts (0.665 mole) of 2,2-di(phenyl-4'-ol)propane (bisphenol A), 200 cc. of absolute ethanol and 150 cc. (0.60 equ.) of 4 N methanolic sodium hydroxide. A stream of nitrogen is maintained and 256 parts (0.58 equivalent) of the $E_{600}$ dibenzene sulfonate of Example 4 is added dropwise to the stirred bisphenoxide solution at 46° to 50° C. over three hours. The addition funnel is rinsed with about 4 parts of absolute ethanol and the reaction mixture is heated to reflux (73° C.) over about ½ hour. Refluxing is maintained with stirring for 1.5 hours and the mixture is cooled. Sodium benzene sulfonate crystallizes during addition and on cooling and is collected and washed with absolute ethanol. The filtrate and washes are evaporated under reduced pressure to a very viscous yellowish oil. The oil is soluble in dilute aqueous alkali, sparingly soluble on ether but readily soluble in methylene chloride. The viscous oil is dissolved in methylene chloride and washed three times with 500 parts of distilled water. Some emulsification occurs and the emulsions break slowly spontaneously. The washed methylene chloride solution is filtered and evaporated to constant weight under reduced pressure. The yield of resin is 310.5 parts which is substantially quantitative.

(B) By substantially the same procedure, 468.5 parts (2.055 moles) of bisphenol A is reacted in 455 parts by volume of absolute alcohol with 433 parts by volume of 4.643 N methanolic sodium hydroxide (2.00 equivalents) and then with 677.6 parts (2.00 equivalents) of the bisbenzene sulfonate of $E_{414}$ of Example 3. Addition requires 2.25 hours at a temperature of 50° to 60° C. and is followed by refluxing (73° C.) for 4 hours. The product is isolated as above. The bisether is a transparent thick honey-colored resin having hydroxyl equivalent of 378. The expected equivalence is 393.5.

(C) Other polyalkylene oxide diols are converted to bis ethers by similar procedures, for example the mixed glycol bis-sulfonate of Example 3 and the bis-sulfonate of P425 are converted to the respective bis ethers with bisphenol A by the above procedure.

Example 7

(A) The bisphenol A bisether is prepared from the $E_{300}$ disulfonate of Example 1 by the following procedure:

A suitable vessel fitted with nitrogen inlet, stirrer, thermometer, pressure equalized dropping funnel and reflux condenser protected by a soda-lime tube is charged with 165 parts (0.723 mole) of bisphenol-A and 200 parts by volume of absolute ethanol and 175 parts by volume of 4 N methanolic sodium hydroxide solution (0.700 equivalent) are added while a stream of nitrogen is maintained. The nitrogen flow is maintained and 200 parts (0.682 equivalent) of the $E_{300}$ disulfonate of Example 1 is added to the stirred contents of the vessel at 45° to 50° C. over about 1.5 hours. A layer of about 50 parts by volume of absolute ethanol on the surface of the viscous disulfonate in the dropping funnel assures completion of the addition by rinsing the sides. When the addition is complete, the reaction mixture is rapidly heated to reflux (about 15 minutes) and refluxed with stirring for 1.5 hours. The reaction mixture is cooled and the sodium benzene sulfonate collected and washed as in Example 6. The filtrate and washes are evaporated as above, dissolved in methylene chloride and washed with water. It is found that the washes are strongly alkaline and, without separation, they are acidified with dilute hydrochloric acid and then neutralized with saturated aqueous sodium bicarbonate solution. The organic phase is separated, dried over anhydrous sodium sulfate and evaporated under reduced pressure to constant weight. The $E_{300}$ di(bisphenol A)ether is a honey colored viscous resin, soluble in dilute aqueous alkali. The yield is substantially quantitative. The calculated effective molecular weight (taking into account a small excess of unreacted bisphenol A) is 660. The molecular weight of the bisether itself is 728.

(B) This same general procedure is used to prepare ethers of alkylated diphenylol propanes. Thus 332 parts of 2,2-bis(3'-allyl phenyl-4'-ol)propane (prepared as described in U.S. Patent 2,910,455) in 340 parts by volume of absolute ethanol is converted to the sodium salt with 239 parts by volume of 4.392 N methanolic sodium hydroxide and reacted with 303 parts of the $E_{300}$ bisbenzene sulfonate of Example 1 as described herein above to give the alkylated ether as a viscous resin. Diphenylol propanes substituted by up to four methyl, ethyl propyl, butyl, crotyl and isocrotyl radicals are also converted to their respective bisethers with polyalkylene glycols by the above procedure by employing quantities based on the stoichiometric ratios shown.

Example 8

A vessel fitted as in Example 7 above and with electric heating mantle is charged with 800 parts by volume of absolute methanol and in it are dissolved 27.6 parts of sodium metal (1196 milliequivalents). To the solution of sodium methoxide under a stream of nitrogen are added 650 parts (1.195 moles) of tetrabromo bisphenol A (2,2-bis(3',5'-dibromo-4'-hydroxpyhenyl) propane. To the mixture at 50° C. to 55° C. are then added, during 15 minutes, 756 parts (0.575 mole) of the $P_{1025}$ disulfonate (prepared as described for the $P_{425}$ disulfonate in Example 2) overlayered with 50 parts by volume of methanol to assure completion of addition.

The mixture is heated to reflux (pot temperature 66° C.) during 1 hour and refluxed for 2 hours. Reflux is then stopped and distillation of the methanol is commenced and continued until the pot temperature is 85° C. at which point 100 parts by volume of toluene is added to the pot and distillation is then continued until the pot temperature again reaches 85° C. Refluxing is then recommenced and continued for 18 hours and the mixture allowed to cool. The resinous material in the vessel contents is then dissolved in 700 parts by volume of methylene chloride. After filtration to remove sodium benzene sulfonate, the organic phase is washed five successive times with twice its volume of water. Assay of the washes shows the presence of 90 milliequivalents of base (93.8% utilization). The washed organic layer is filtered and evaporated to constant weight under reduced pressure. The dark brown viscous resin having a viscosity of 216,000 centipoises at 25° C. is obtained in almost quantitative yield. The epoxy equivalent weight is found to be 1003, calculated for the bisphenol 1021.

In the same way, using corresponding stoichiometric proportions viscous resinous bisphenolic ethers are prepared employing the bis benzene-sulfonates of polypropylene glycol 425 and polybutylene glycol 1000 prepared in Example 2. The very viscous deep yellow syrupy bisether from polypropylene glycol 425 is found to have a refractive index of about 1.594 and density at 20° C. of 1.923 g. per ml. By using tetrachlorobisphenol A in similar molar proportions instead of the above tetrabromo compound, bisphenolic ethers substituted by chlorine are obtained from the above procedures.

Example 9

When other binuclear bisphenols are employed in corresponding stoichiometric proportions in the procedures of Example 7(A) above with the $E_{300}$ bisbenzene sulfonate of Example 1, the bisphenolic ethers are produced. Thus bisphenolic ethers of polyethylene glycol are obtained as resins from 4,4'-dihydroxybiphenyl, 1,1-bis(2-hydroxy-3-isopropylphenyl)-ethane (prepared as described in U.S. Patent 2,829,175), 1,1 - bis(2 - hydroxy-5-sec-butyl)-1-phenyl propane and other bisphenols disclosed in said patent having up to 13 carbon atoms between the two benzene rings.

Example 10

This example particularly illustrates the process of the reaction in which the functional substituents of the aryl group is a reactive group, viz. a carboethoxy group.

(A) In a vessel fitted as described in Example 7 above are placed 1000 parts by volume of absolute ethanol and in it are dissolved 30 parts (1.305 equivalents) of metallic sodium. To the resultant solution of sodium ethoxide under an atmosphere of nitrogen are added 216.8 parts (1.306 moles) of ethyl p-hydroxy benzoate with 50 parts of volume of absolute ethanol as a rinse. The mixture is heated to 65° to 68° C. pot temperature and 372 parts (1.25 equivalents) of $E_{300}$ bisbenzene sulfonate (prepared as in Example 1) with 50 parts by volume overlaying absolute ethanol wash are added over 75 minutes. The temperature of the reaction mixture is raised so that refluxing occurs (78° C.) and is maintained at that point for 5 hours. The reaction mixture is cooled and is found to be alkaline (pH 8.5). The precipitate of sodium benzene sulfonate is collected and washed with absolute ethanol and the filtrate and washes are stripped of ethanol under reduced pressure. The residue is taken up in methylene chloride and washed four times with water. The washes are titrated to neutrality with standard acid and show that 3.7% of the base remains unconsumed. The organic layer is dried and evaporated to constant weight under reduced pressure. The bis(p-carboethoxy phenyl) ether of polyethylene glycol-300 is a transparent colorless oily liquid having $n_D^{25} = 1.5252$.

(B) By following the same procedure employing 500 parts of absolute ethanol, 15.3 parts of sodium metal, 100 parts (0.329 mole) of methyl salicylate and 193 parts of $E_{300}$ bis benzene-sulfonate. The bis (O-carbomethoxy phenyl) ether of polyethylene glycol-300 is obtained in substantially quantitative yield as a water white liquid having $n_D^{25}=1.5149$. Transesterification apparently did not occur.

Example 11

The procedure described in Example 10 above is repeated employing the 1,2,6-tris(omega hydroxypolypropoxy) hexane tribenzene sulfonate of Example 5.

A vessel fitted as above is charged with 500 parts by volume of absolute ethanol and 35.6 parts (1.55 gram atoms) of sodium metal is dissolved in it. To the solution of sodium ethoxide under a nitrogen atmosphere are added 274.6 parts (1.68 mole) of ethyl p-hydroxy benzoate and the mixture is warmed to about 55° C. To the mixture stirred under nitrogen at 55–68° C., 547.5 parts (1.50 equivalents) of the trisbenzene sulfonate of Example 5 are added during 190 minutes. The reaction mixture is then refluxed with stirring for 22.5 hours and the solvent removed under reduced pressure. The residue is taken up in 500 parts by volume of methylene chloride and filtered to remove the precipitated sodium benzene sulfonate. The organic layer is washed thrice with 500 parts of water and these washes are back washed with methylene chloride. Titration of the washes indicated substantially stoichiometric consumption of base. The organic solutions are combined, dried and evaporated to constant weight. The tris(p-carboethoxy phenyl) ether of 1,2,6-tris(omega hydroxypolypropoxy)hexane is obtained in quantitative yield as a clear brown viscous liquid with $n_D^{24}=1.5040$.

Example 12

The above procedure is repeated employing dihydroxy-tetraphenyl methane (prepared as described by Zinke and Wugk, Annalen vol. 363, page 279 (1908) of the formula:

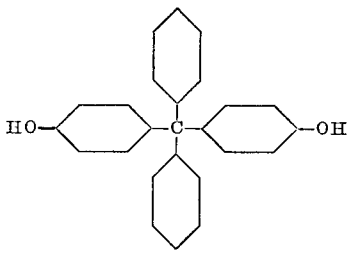

as the bisphenol.

To a solution of 200 parts of the dihydroxy-tetraphenyl methane (0.526 mole; based on titration) in 300 parts by volume of absolute ethanol and 132 parts by volume (10 mole percent excess) of 4.392 N methanolic sodium hydroxide are added over 40 minutes (pot temperature 52°–58° C.) 146 parts (0.515 equivalent) of $E_{300}$ bis-benzene sulfonate (prepared as in Example 1). The mixture is heated to reflux at 73° C. in 15 minutes and is refluxed for 2.75 hours. After standing over night supernatant liquid is decanted from the pasty unfilterable reaction mixture and the latter is evaporated under reduced pressure and taken up in methylene chlorine. Insoluble salts are collected and the combined solutions are washed repeatedly with water. Titration of these washes shows that the reaction was about 98% of completion. The washed solution is brought to constant weight under reduced pressure to give the bis(dihydroxy tetraphenyl methane) ether of the $E_{300}$ glycol as a dark yellow-brown resin solid at room temperature.

Example 13

Essentially the procedure of the above examples is repeated employing a suspension of the sodium salt of dihydroxydiphenyl sulfone (from 514 parts of the sulfone and 476 parts by volume of 4.643 N methanolic sodium hydroxide) in 500 parts of absolute ethanol. To the stirred suspension maintained at 55° to 60° C. are added 678 parts of $E_{412}$ bis-benzene sulfonate (prepared as in Example 3 above) during about 1.6 hours. Stirring is continued at about 60° for 1 hour further and then for about 16 hours while the mixture cools to room temperature. The next day the reaction mixture is refluxed for 7 hours and after standing overnight again is refluxed for a further 4 hours. After standing overnight once more the reaction mixture has separated into a solid phase and two liquid phases. Solvents are removed under reduced pressure (the product being substantially insoluble in the hydroxylated solvents present) and the residue taken up in methylene chloride and worked up as in Example 12 to give resinous brownish bis(p-hydroxybenzenesulfophenyl)ether of polyethylene glycol.

Example 14

The bis resorcinol ether of polyethylene glycol $E_{300}$ is prepared by following the procedures described above by first reacting 82.0 parts (0.748 mole) of resorcinol in 150 parts by volume of absolute ethanol with 166.5 parts by volume of 4.497 N methanolic sodium hydroxide followed by reaction with 206 parts of $E_{300}$ bis benzene sulfonate (prepared as described in Example 1). The bis resorcinol ether is recovered as above as a yellowish resin.

REACTIONS OF FUNCTIONAL SUBSTITUENTS CARBOALKOXY GROUP TERMINAL

The following examples illustrate procedures which can be employed on the terminal ester groups of the compounds of Examples 10 and 11.

Example 15

A vessel adapted for heating and fitted with reflux condenser is charged with 200 parts by weight (0.653 mole) of the bis (p-carboalkoxyphenyl) ether of Example 10A, 55 parts by volume of 18 N sodium hydroxide (0.99 equivalent), 100 parts of water, and 250 parts of ethanol (the three last all by volume) and heated under reflux for 7 hours. After cooling the homogeneous solution is transferred to a beaker and acidified with 1:4 aqueous hydrochloric acid. The liquid acid which separates rapidly becomes a resinous solid. The supernatant liquid is decanted and discarded and the resinous to waxy free acid is steamed in 1000 parts of water to melt it and wash it. On cooling the bis (p-carboxy phenyl) ether of polyethylene glycol 300 resolidifies and is collected, washed with water and dried under reduced pressure. Titration shows a molecular weight of 556.4 as compared to the calculated value of 554. The acid is obtained in excellent yield. It melts at about 102° to 110° C. to a cloudy, possibly mesomorphic liquid and melts clear from 110° to 115° C. It is valuable as an acidic cross-linking agent having rather low melting point and high molecular weight, for example, in curing oxirane resins.

Saponification by this procedure of the bis(O-carbomethoxyphenyl) ether of Example 10B provides the diacid which is most unusual in being a liquid. Refractive index at 25° C., 1.5149.

Example 16

The procedure of the next above example is repeated employing the tris(carboalkoxyphenyl) ether of Example 11 using 566.3 parts by weight (1.48 moles) of the tris ether, 1200, 248 and 480 parts by volume respectively of 95% methanol, 18 N sodium hydroxide (4.44 moles) and water. Refluxing is continued for 9 hours. On acidification the organic acid separates as an oil which does not solidify on standing. It is taken up in methylene chloride and washed with water, the washes being back washed with methylene chloride, and the combined organic solutions evaporated at 98° C. and 1 mm. Hg pressure to a brown viscous syrup. This material is rather remarkable in being a liquid tricarboxylic aromatic acid of value in curing, e.g. oxirane resins. The neutralization equivalent is found to be 353 in excellent agreement with the value of 355 calculated for the acid having formula:

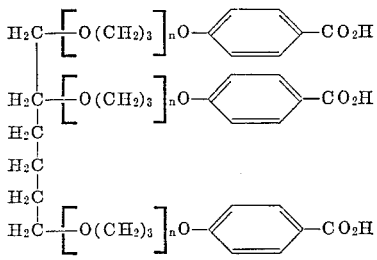

where $n$ is about 3.3.

Example 17

This sample illustrates the conversion of terminal carboethoxy groups to carbohydrazide groups and subsequent conversion thereof to triazole groups linking a plurality of molecules.

A vessel fitted with reflux condenser and steam heating means is charged with 246.2 parts (0.402 mole) of the bis-(p-carboalkoxyphenyl) ether of Example 10, 650 parts by volume of absolute ethanol and 410 parts by volume of 85% hydrazine hydrate. It is found that a large excess of hydrazine hydrate is necessary in this reaction to overcome the decreased reactivity of these ester groups which it is noted also are effectively at a low concentration because of the bulk of the molecules. Somewhat elevated pressure may be employed to assist the reaction. The reaction mixture is refluxed at atmospheric pressure for 7 hours and evaporated under reduced pressure to constant weight. The dihydrazide is obtained in quantitative yield as a very nearly colorless oil which has the remarkable property for the dihydrazide of an aromatic acid of being moderately soluble in water. It is useful for the curing of epoxy resin prepolymers. Analysis shows the presence of the expected content of nitrogen.

The above dihydrazide is converted to a substantially linear triazole by thermal dehydration. A spherical vessel rotatably mounted so that it is deeply submerged in a heated oil bath and can be flushed with a stream of nitrogen through a capillary is charged with 117.8 parts of the above dihydrazide. The charge is heated to 190° (all temperatures are bath temperatures) and held for 10 minutes. The temperature is raised to 210° over 10 minutes, held at that temperature for 23 minutes, and 1 part of 85% hydrazine hydrate is added. In 3 minutes, after foaming has subsided, the temperature is raised to 220° over 17 minutes and a further similar portion of hydrazine hydrate is added. After the foaming has subsided, the pressure in the vessel is reduced first to 25 mm. Hg for 30 minutes then to about 2 mm. Hg for 50 minutes. The temperature is further raised to 230° C. which maintained with 2 mm. Hg pressure in the vessel for 4½ hours. Heating is discontinued and the vessel and contents permitted to cool. The polymer is a pale brown tacky solid which can be melted and drawn into filaments.

The above procedure for the preparation of the dihydrazide is repeated employing 176.8 parts of the bis(O-carbomethoxyphenyl)ether of Example 10B, 250 parts by volume of 85% hydrazine hydrate and 200 parts by volume of absolute ethanol. The resultant O,O'-dihydrazide is obtained in almost quantitative yield as an almost colorless slightly cloudy liquid with $n_D^{25}=1.5539$.

*Analysis.*—Calculated: N, 9.55%. Found: N, 9.80%.

PHENOLIC TERMINAL GROUPS

Example 18

This example illustrates the preparation of a phenol-formalehyde type of casting resin from a polyphenol of the invention, specifically the bisether of Example 7.

A suitable vessel, such as a resin flask, is charged with 151 parts of the (4-(4'-hydroxyphenol-2-propylydyl)phenyl) ether of polyethylene glycol 300. The weighing vessel is rinsed with 50 parts by volume of n-butanol and the rinses are added to the charge together with 68 parts of 37% formaldehyde and 3.6 parts of 3.72 N methanolic sodium hydroxide. The mixture is heated for 4 hours under reflux during which time the pot temperature rises from 80° to 89° C. and remains there for 2 hours of further refluxing. The pressure in the vessel is reduced to 30 mm. and water and organic solvents are removed leaving a very viscous resole. Alkali is neutralized and a catalytic excess of acid provided by adding 3.25 parts of lactic acid in 7.5 parts of glycerol during 10 minutes followed by rinses of 3–10 parts by volume of methanol. Solvent is again removed at 30 mm. Hg pressure for 65 minutes at which time the temperature in the vessel is 80° C. At this point an aliquot is found to give a sample which remains sticky in water. After 5 minutes further heating the pot temperature has reached 93° C. and a sample is found to be no longer sticky and yields to finger pressure. The batch is discharged and is a pale yellow very slightly tacky resin.

Samples of the resin are cured (the slight excess of lactic acid present acting as catalyst) for from 3 to 6 days at 90° C. A sample cured for 3 days is found to be soft and flexible but with a plastic memory such that after deformaiton as by bending it spontaneously reassumes its earlier shape. A sample cured for 4 days in a circular shape is found to be hard and tough. A disc can be punched from it using a cork borer struck with a hammer without fracture of the resin. A sample cured 6 days is found to be tough and flexible. Water formed during curing diffuses out to leave a clear resin.

For comparison with the above a similar resin is made from bisphenol A (instead of the bisphenol of the invention) employing substantially identical conditions and stoichiometric proportions. The bisphenol A-formaldehyde resin is found to be more yieldable to pressure when cooled under water than that made above. On curing as above described the cured resin is found to be hard and extremely brittle. Water formed during the curing diffuses away only with difficulty and the cured resin tends to remain cloudy.

Example 19

This example illustrates the formation of a bis ether of a bisphenol of the invention as applied to the process for making a bisglycidyl ether.

In a vessel fitted with stirrer, thermometer dropping funnel and condenser arranged for downward distillation are placed 100 parts by weight (0.12 mole) of the bisphenol A bisether of $E_{600}$ glycol of Example 6 and 650 parts by volume (about 70 times the stoichiometric proportion) of epichlorhydrin. Twenty-five parts by volume are distilled to carry off traces of water and 75 parts by volume of 4 N methanolic sodium hydroxide (25% excess) is added over a period of 80 minutes at a pot temperature of 80° to 95° C. while continuing distillation to remove water as formed. Distillation is continued for a further 30 minutes so that a total of 116 parts by volume is collected in addition to the 25 parts initially distilled. The reaction mixture is cooled and filtered and the filter cake washed with acetone. The combined filtrate and wash is evaporated to constant weight under about 2 mm. Hg pressure to a bath temperature of 120° C. The yield is almost quantitative. The calculated oxirane content for the bisglycidyl ether is 3.34% based on a molecular weight of 835 due to the presence of unreacted bisphenol A in the bisphenol of the invention employed. Found: 3.43%.

Bisglycidyl ethers of the invention cure to epoxy resins having outstanding toughness, adhesivity and deformability without fracture.

The same procedure is repeated using 523.5 parts of the bisether of $E_{414}$ polyethylene glycol with bis phenol A of Example 6B, 2500 parts by volume of epichlorhydrin 344 parts by volume of the 4.643 N methanolic sodium hydroxide. The bis glycidyl ether is obtained as a somewhat yellowish resin having an oxirane equivalent weight of 456; calculated 449.5.

The procedure is also repeated using the bisphenol A ether of the mixed glycol:

$$HOC_2H_4O(C_3H_6O)_{16.3}\text{-}C_2H_4OH$$

(prepared in Example 6 from the bis ester of Example 3) and the glycidyl ether is obtained as a brownish oil.

Example 20

The above procedure is repeated employing 100 parts of bisphenol A bisester of $E_{300}$ glycol of Example 7 and the diglycidyl ether is obtained as a honey-colored, transparent resin in quantitative yield. The oxirane content is found to be 4.18% in good agreement with the value of 4.15% calculated for a molecular weight of 772.

The above procedure is repeated employing 300 parts of the allyl-substituted bis phenol glycol ether of Example 7, 1500 parts by volume of epichlorhydrin and 300 parts by volume of 4.392 N methanolic sodium hydroxide. The product is isolated by the procedures employed above and after removal of solvent at 120° C. and 1 mm. of Hg pressure is a light brown resin having considerable fluidity. The oxirane equivalent weight is 475.4; calculated 489.

Example 21

The diglycidyl ether of the tetrabromobisphenol A ether of polyethylene glycol 1025 of Example 8 is prepared in the same manner as above and is a dark colored, viscous liquid obtained in quantitative yield. It has an oxirane content of 1.59% as compared to 1.56% calculated on the basis of the molecular weight of 2042.

Example 22

The procedure of Example 19 is repeated employing 243.6 parts of the dihydroxy tetraphenyl methane bis ether of $E_{300}$ polyethylene glycol of Example 12 in 1300 parts by volume of epichlorhydrin to which 135 parts by volume of 4.392 N methanolic sodium hydroxide are added at 85° C. over about 80 minutes. The product is isolated as above. The glycidoxy phenyl diphenylmethyl phenyl bis ether of $E_{300}$ polyethylene glycol is obtained as a yellowish oily resin. It cures on heating 6.14 parts with 0.50 part of methylene bis aniline by first gelling at 300° F. in 45 minutes and further heating at 360° F. 24 hours. The cured resin is hard and strong at room temperature.

Example 23

The same procedure of Example 19 is repeated using 250.8 parts of the dihydroxydiphenyl sulfone bis ether of polyethylene glycol $E_{414}$ of Example 13 in 2000 parts by volume of epichlorhydrin to which are added at about 100° C. over about 2 hours 250 parts by volume of 4.643 N methanolic sodium hydroxide. The yellowish resinous product obtained after working up as above has an epoxy oxirane equivalent weight of 479.

Example 24

The same procedure of Example 19 is also repeated with the total product of Example 14 assuming the presence of 0.68 equivalent of the biphenol and 0.136 equivalent of excess resorcinol. The resinous material is dissolved in 1800 parts by volume of epichlorhydrin and 182 parts by volume of 4.497 N methanolic sodium hydroxide (1.57 times the calculated amount) are added over 80 minutes at about 85° to 95° C. The reaction mixture is worked up as before to give the bis glycidyl ether as a yellowish oily resin containing 0.4 percent of active chlorine and having oxirane equivalence of 270 (calculated 277). It will be apparent that many variations can be made by those skilled in the art within the scope of the invention as illustrated and described hereinabove without departing from the spirit thereof.

Example 25

This example illustrates the reaction of the bisphenols of the invention with asymmetrically difunctional reactants and particularly with glycidyl alkenoates, e.g. the acrylate and the methacrylate.

An amber glass (for protection from actinic radiation) screw cap bottle is charged with 44.35 parts (0.134 equivalent) of the bis(bisphenol A) ether of $E_{300}$ of Example 7A, 21.0 parts (0.147 equivalent) of glycidyl methacrylate containing about 0.008 percent by weight of hydroquinone (to inhibit vinyl-type polymerization) and 0.65 part of N,N-dimethyl-p-toluidine. The bottle is agitated by rotating slowly for about 18 hours and then allowed to stand for about 5 to 7 days until a small sample to which is added 0.25 weight percent of benzoyl peroxide polymerizes within about 5 to 10 minutes, after being degassed under nitrogen, by warming at 50° to 60° C. to give a tough hard thermoset resin.

The homogeneous product of the reaction is a valuable bismethacrylate type monomer which polymerizes to thermoset resins. It contains about 0.3 percent of oxirane oxygen as a result of the excess of glycidyl methacrylate employed and retains the dimethyl-p-toluidine.

Similar results are obtained from 44 parts of the bisphenol A bisether of $E_{600}$ of Example 6A, 15.7 parts of glycidyl methacrylate, 0.015 part of benzoquinone and 0.6 part of dimethyl-p-toluidine blended together for about 3 hours and permitted to stand for 3 days at which point it is polymerized as described above to a tough thermoset resin.

The bisphenol A bisether of the mixed glycol of Example 6C (100 parts) is first mixed with 24.9 parts of glycidyl methacrylate and 0.032 part of benzoquinone for ½ hour and then 1.25 parts of dimethyl-p-toluidine are added and mixing is continued for about 16 hours. At this point the methacrylyl glyceroxy ether is polymerized as described above to a tough thermoset resin.

Acrylyl and methacryl glyceroxy ethers of the bisphenol A bisether of $P_{425}$ glycol (Example 6C) are made by blending two portions of 450 parts of the bisether warmed to 50° C. and containing 0.15 part of benzoquinone with 154.6 parts of glycidyl acrylate and 179.2 parts of glycidyl methacrylate, respectively, as above until each is homogeneous and then adding about 6 parts of dimethyl-p-toluidine to each blend and blending for a further 2 hours. After standing overnight each is polymerizable as described above to give tough hard thermoset resins.

The reaction of the bisphenol and glycidyl ester may also be effected more rapidly at 50° to 60° C. but there is a tendency for polymerization to occur simultaneously with gellation of the entire reaction mixture in which the polymerized glycidyl ester is plasticized by the bisphenol. The more elevated temperatures are advantageous when the bisphenolic ether is so viscous as not to blend readily at ambient temperatures, for example, when the oxa-substituted central chain contains 10 or more oxygen atoms. Other catalysts to promote reaction of the phenolic groups with the oxirane groups of the glycidyl ethers may also be used.

Other valuable adducts are obtained by reacting other bisphenols of the invention described, for example, in Examples 6 to 14 inclusive above with glycidyl acrylate and methacrylate respectively as described above.

What is claimed is:

1. A polyether of at least five-fold and not more than about fifty-fold oxa-substituted aliphatic polyol at least twice etherified with p-glycidoxy substituted bisnuclear phenolic compound;

(I) said polyol having not more than three hydroxyl groups and oxa-substituents being separated by two to six carbon atoms and
(II) said bisnuclear phenolic compound having a nucleus comprising
(A) not more than one catenary carbon atom;
(B) 2 benzene rings functionally substituted on one benzene ring by a glycidoxy group and
(C) spaced apart benzene rings being separated by not more than one atom and connected by a divalent member of the group consisting of sulfone and hydrocarbon radicals of one to 13 carbon atoms.

References Cited
UNITED STATES PATENTS

| | | | |
|---|---|---|---|
| 3,145,191 | 8/1964 | Perfetti | 260—47 |
| 3,374,204 | 3/1968 | Masters et al. | 260—47 |

NORMA S. MILESTONE, Primary Examiner

U.S. Cl. X.R.
260—2, 47, 51, 52

UNITED STATES PATENT OFFICE
CERTIFICATE OF CORRECTION

Patent No. 3,494,939  Dated February 10, 1970

Inventor(s) CARL M. SMITH

It is certified that error appears in the above-identified patent and that said Letters Patent are hereby corrected as shown below:

Column 4, lines 61-62, "$[ZSO_2-O-(alk-O)_n]_m-Q+MZSO_3M \longrightarrow [YAr-O-(alk-O)_n]_m Q+mArSO_3M+mH_2O$" should read --$[ZSO_2-O-(alk-O)_n]_m-Q+mYArOH+MOH \longrightarrow [YAr-O-(alk-O)_n]_m Q+mZSO_3M+mH_2O$--; line 75, "practive" should read --practice--. Column 13, line 19, "sample" should read --example--. Column 14, line 28, "deformaiton" should read --deformation--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents